(12) United States Patent
Coupin

(10) Patent No.: US 10,266,690 B2
(45) Date of Patent: Apr. 23, 2019

(54) POLYMER COMPOSITION COMPRISING POLY-LACTIDE-POLYBUTADIENE BASED BLOCK COPOLYMER

(71) Applicant: Total Research & Technology Feluy, Seneffe (BE)

(72) Inventor: Thierry Coupin, Carnieres (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 17 days.

(21) Appl. No.: 15/305,690

(22) PCT Filed: Apr. 28, 2015

(86) PCT No.: PCT/EP2015/059242
§ 371 (c)(1),
(2) Date: Oct. 21, 2016

(87) PCT Pub. No.: WO2015/165918
PCT Pub. Date: Nov. 5, 2015

(65) Prior Publication Data
US 2017/0044362 A1 Feb. 16, 2017

(30) Foreign Application Priority Data

Apr. 29, 2014 (EP) ..................................... 14166456

(51) Int. Cl.
*C08L 67/04* (2006.01)
*C08L 53/00* (2006.01)
*C08G 81/02* (2006.01)
*C08J 3/00* (2006.01)

(52) U.S. Cl.
CPC ............ *C08L 67/04* (2013.01); *C08G 81/027* (2013.01); *C08J 3/005* (2013.01); *C08L 53/00* (2013.01); *C08J 2367/04* (2013.01); *C08J 2467/04* (2013.01); *C08L 2205/02* (2013.01); *C08L 2205/025* (2013.01)

(58) Field of Classification Search
CPC . C08L 67/04; C08L 2205/025; C08G 63/912; C08G 18/631; C08G 18/694; C08G 18/692
See application file for complete search history.

(56) References Cited

U.S. PATENT DOCUMENTS

2012/0189860 A1   7/2012   Li et al.

FOREIGN PATENT DOCUMENTS

| EP | 2476729 A1 | 7/2012 | | |
|---|---|---|---|---|
| FR | 2953218 A1 * | 6/2011 | ......... | B29C 45/0001 |
| FR | 2953218 A1 | 6/2011 | | |
| WO | 2008037772 A1 | 4/2008 | | |
| WO | WO-2008057214 A2 * | 5/2008 | ......... | B24C 47/0021 |
| WO | 2010133419 A2 | 11/2010 | | |
| WO | 2011144625 A1 | 11/2011 | | |

OTHER PUBLICATIONS

International Search Report issued in PCT/EP2015/059242, dated Jul. 20, 2015, 4 pages.
EP Application No. 11167138; "Process For The Polymerization of Cyclic Carbonates"; Filing date: May 23, 2011; 24 pages.
Na-Youn Kim et al, "Enhanced impact properties of polylactide by poly(lactide-b-butadiene-b-lactide) triblock copolymer", Macromolecular Research, (2011), vol. 19, No. 9, pp. 943-947.
Anderson K S et al, "Melt preparation and nucleation efficiency of polylactide stereocomplex crystallites", Polymer, Elsevier Science Publishers B.V, GB, vol. 47, 2006, pp. 2030-2035.

* cited by examiner

*Primary Examiner* — Mark S Kaucher
(74) *Attorney, Agent, or Firm* — Albert Shung

(57) ABSTRACT

The present invention relates to a composition comprising:
(a) at least one first polymer selected from the group consisting of poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer; and
(b) at least one second polymer selected from the group consisting of poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof,
wherein when the at least one first polymer is poly-L-lactide-polybutadiene (PLLA-PB) block copolymer, or poly-L-lactide-urethane-polybutadiene block copolymer, then the at least one second polymer is selected from the group consisting of poly-D-lactide, or poly-D-lactide-polybutadiene (PDLA-PB) block copolymer, poly-D-lactide-urethane-polybutadiene block copolymer, poly-D-lactide-urethane, and mixture thereof, or
wherein when the at least one first polymer is poly-D-lactide-polybutadiene block copolymer, or poly-D-lactide-urethane-polybutadiene block copolymer, then the at least one second polymer is selected from the group consisting of poly-L-lactide, or poly-L-lactide-polybutadiene block copolymer, poly-L-lactide-urethane-polybutadiene block copolymer, poly-L-lactide-urethane, and mixture thereof;
wherein said composition comprises from 40% to 99% by weight of said second polymer based on the total weight of the composition.
The present invention also relates to a process for preparing said composition. The present invention also relates to an article comprising said composition.

11 Claims, 5 Drawing Sheets

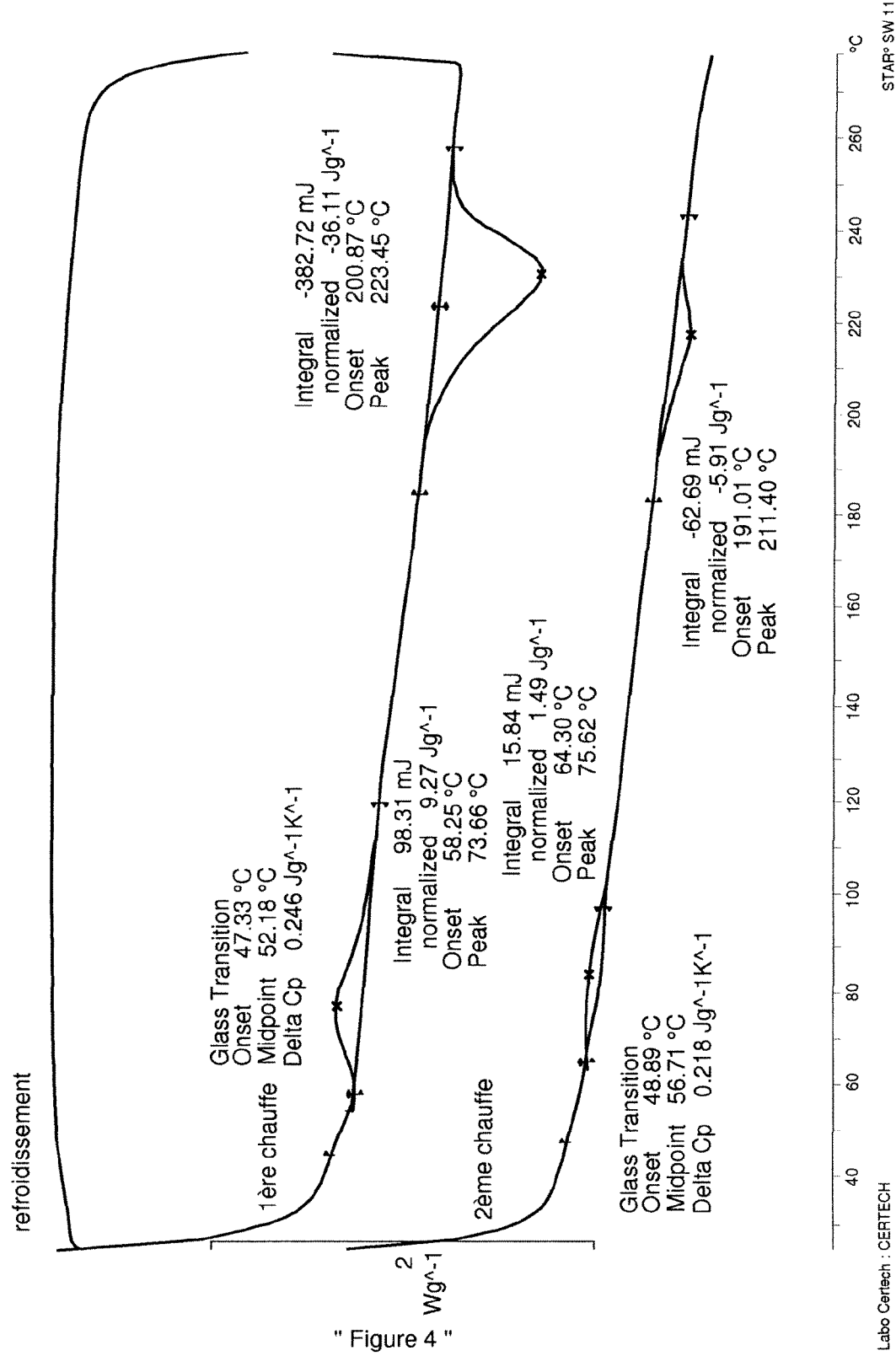
"Figure 4"

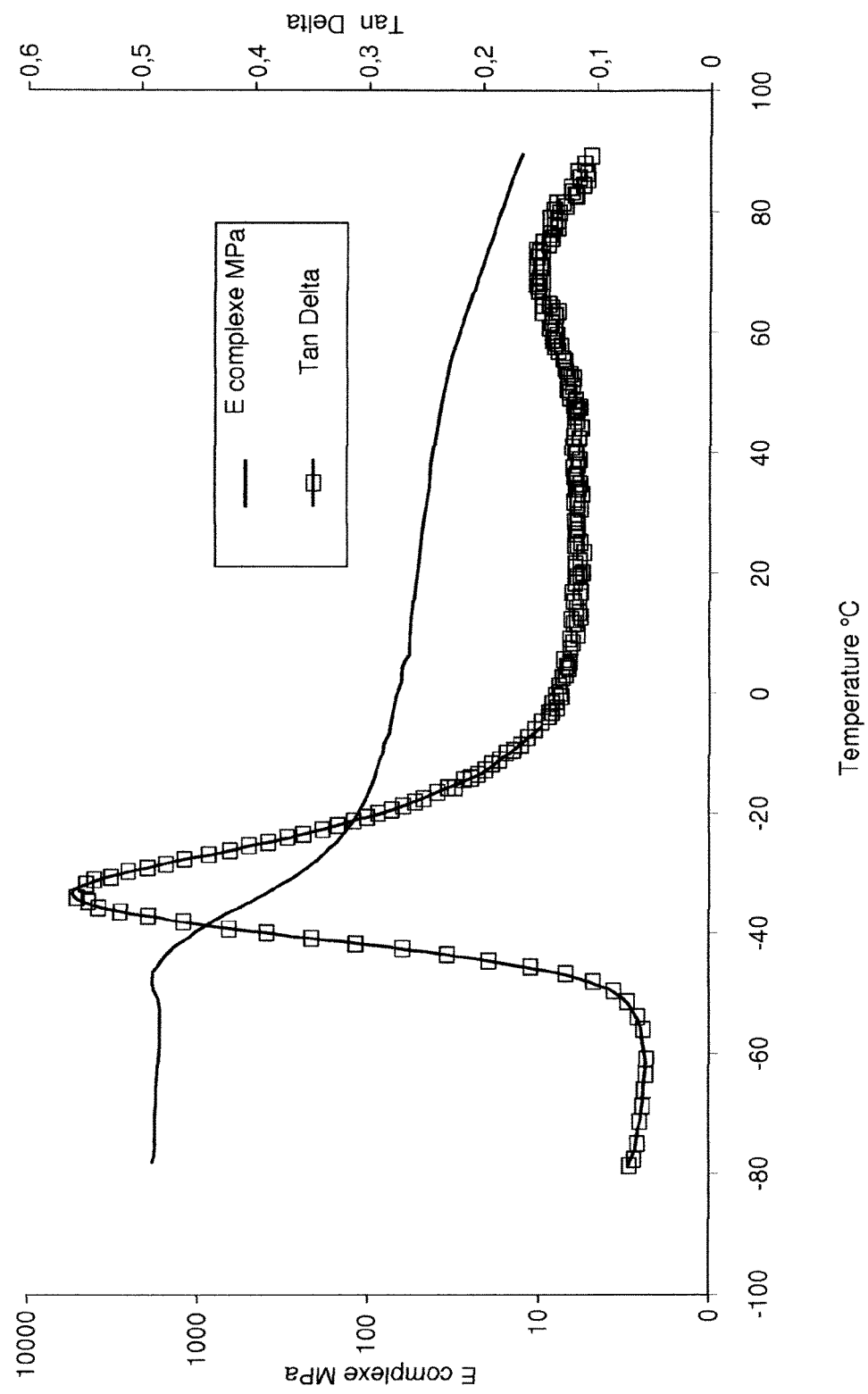
"Figure 5"

POLYMER COMPOSITION COMPRISING POLY-LACTIDE-POLYBUTADIENE BASED BLOCK COPOLYMER

CROSS-REFERENCE TO RELATED APPLICATIONS

This application claims the benefit of PCT/EP2015/059242, filed Apr. 28, 2015, which claims priority from EP 14166456.5, filed Apr. 29, 2014.

FIELD OF THE INVENTION

The invention pertains to a composition comprising a poly-lactide-polybutadiene based block copolymer, and at least one second polymer or block copolymer.

BACKGROUND OF THE INVENTION

Polylactide also referred as polylactic acid (PLA) is a synthetic aliphatic polyester derived from renewal resources, such a corn, sugar beet and cassava, which can ultimately be degraded under composting conditions.

Although attempts have been made to utilize PLA for various end-use applications, PLA is known to be brittle and exhibit low toughness, which can result in low impact strength products or articles. Impact resistance of PLA can be modified by using existing polymeric impact modifiers; however, currently available polymeric impact modifiers always decrease transparency of PLA material. A liquid plasticizer can be used at high content (>15%) to improve impact resistance of PLA, however during the life time of the PLA blend, there is migration of the plasticizer.

Impact modifiers such as rubber, poly(ethylene glycol) (PEG), and acrylonitrile-butadiene-styrene copolymer (ABS) have been tested. Nevertheless, the immiscibility between these impact modifying additives and the PLA matrix is a major drawback.

Commercially available BioStrength® 150 a methyl methacrylate-butadiene-styrene co-polymer (MBS) is one of the best currently available impact modifiers for PLA; however haze of the resulting PLA material increases from 5, for pure PLA to 95 when 15% w/w of BioStrength® 150 is added. Another commercial product, BioStrength® 280, an acrylic core shell impact modifier, is a less efficient impact modifier, although the resulting PLA material is said to remain transparent. Nevertheless, the present inventors observed that addition of 15% w/w of BioStrength® 280, produces a material with a haze of 44.

Plasticizers are additives that increase the fluidity of a material. Commonly used plasticizers, are tributyl citrate (TBC) and acetyl tributyl citrate (ATBC). However, when 15% TBC or ATBC were mixed with PLA, the present inventors observed a plasticizer migration after storage for a few days at room temperature in summer time (25-30° C.).

Other commonly used polymer modifiers are styrene block copolymers, such as poly(styrene-butadiene-styrene), or SBS. Further studies performed by the present inventors, showed that a blend of PLA with SBS exhibited a total incompatibility even at a concentration as low as 10% w/w of SBS.

There is therefor a need to improve the compositions of the prior art.

SUMMARY OF THE INVENTION

A first aspect of the present invention provides a composition comprising:
(a) at least one first polymer selected from the group consisting of poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer; and mixture thereof; and
(b) at least one second polymer selected from the group consisting of poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof;
wherein when the at least one first polymer is poly-L-lactide-polybutadiene (PLLA-PB) block copolymer, or poly-L-lactide-urethane-polybutadiene block copolymer, then the at least one second polymer is selected from the group consisting of poly-D-lactide, poly-D-lactide-polybutadiene (PDLA-PB) block copolymer, poly-D-lactide-urethane-polybutadiene block copolymer, poly-D-lactide-urethane, and mixture thereof; or
wherein when the at least one first polymer is poly-D-lactide-polybutadiene block copolymer, or poly-D-lactide-urethane-polybutadiene block copolymer, then the at least one second polymer is selected from the group consisting of poly-L-lactide, poly-L-lactide-polybutadiene block copolymer, poly-L-lactide-urethane-polybutadiene block copolymer, poly-L-lactide-urethane, and mixture thereof.

The present inventors have surprisingly found that it is possible to produce stereocomplex crystallites by adding to a PLA based polymer at least one PLA-PB based block copolymers. Said stereocomplex crystallites can advantageously be used to improve the resulting resin's properties, such as melt strength, impact strength and nucleation crystallization.

A second aspect of the present invention encompasses a process for preparing a composition according to the first aspect of the invention, said process comprising the step of contacting at least one first polymer with at least one second polymer,
wherein said at least one first polymer is selected from the group consisting of poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer, and mixture thereof; and
said at least one second polymer is selected from the group consisting of poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof;
wherein when the at least one first polymer is poly-L-lactide-polybutadiene (PLLA-PB) block copolymer, or poly-L-lactide-urethane-polybutadiene block copolymer, then the at least one second polymer is selected from the group consisting of poly-D-lactide, poly-D-lactide-polybutadiene (PDLA-PB) block copolymer, poly-D-lactide-urethane-polybutadiene block copolymer, poly-D-lactide-urethane, and mixture thereof; or
wherein when the at least one first polymer is poly-D-lactide-polybutadiene (PDLA-PB) block copolymer, or poly-D-lactide-urethane-polybutadiene block copolymer, then the at least one second polymer is selected from the group consisting of poly-L-lactide, poly-L-lactide-polybutadiene (PLLA-PB) block copolymer, poly-L-lactide-urethane-polybutadiene block copolymer, poly-D-lactide-urethane, and mixture thereof A third aspect of the invention encompasses an article comprising a composition according to the first aspect of the invention, or prepared using a process according to the second aspect of the invention.

A fourth aspect of the invention encompasses the use of poly-L-lactide-polybutadiene (PLLA-PB) block copolymer, poly-D-lactide-polybutadiene (PDLA-PB) block copolymer, poly-L-lactide-urethane-polybutadiene block copolymer, or poly-D-lactide-urethane-polybutadiene block copolymer, as nucleating agent for polymers, and/or as impact modifier.

The above and other characteristics, features and advantages of the present invention will become apparent from the following detailed description, taken in conjunction with the accompanying drawings, which illustrate, by way of example, the principles of the invention. The reference figures quoted below refer to the attached drawings.

BRIEF DESCRIPTION OF THE FIGURES

FIG. 4 represents a graph showing the DSC profile of composition 4 according to an embodiment of the invention.

FIG. 5 represents a graph showing the DMA profiles of composition 4 according to an embodiment of the invention, showing the complex modulus (E) curve, and computed tan delta curve.

DETAILED DESCRIPTION OF THE INVENTION

Figure 1:
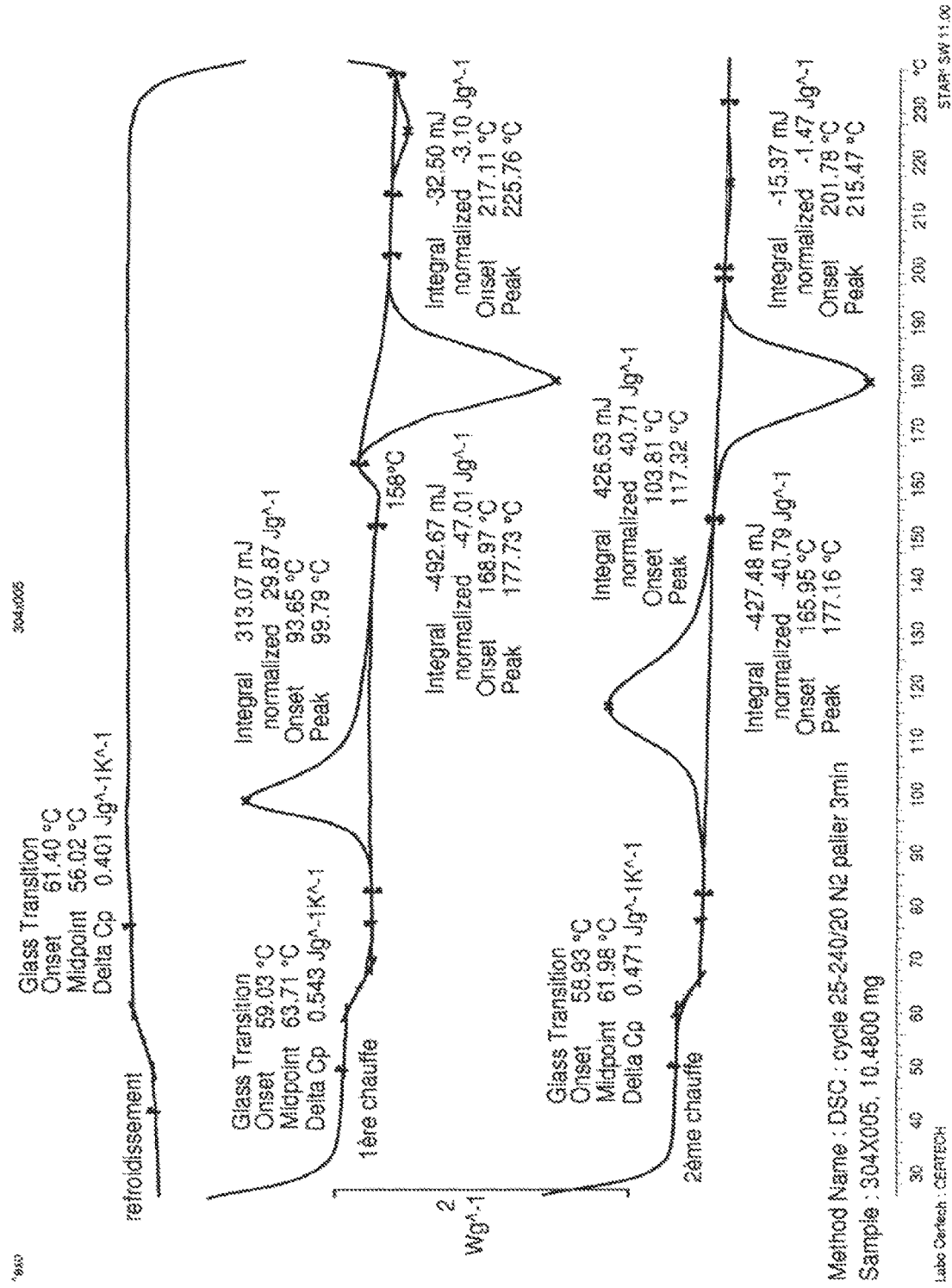
FIG. 1 represents a graph showing the DSC profile of composition 1 according to an embodiment of the invention.

When describing the invention, the terms used are to be construed in accordance with the following definitions, unless a context dictates otherwise.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used in the specification and the appended claims, the singular forms "a", "an," and "the" include plural referents unless the context clearly dictates otherwise. By way of example, "a layer" means one layer or more than one layer.

Unless defined otherwise, all technical and scientific terms used herein have the same meaning as is commonly understood by one of skill in the art. All publications referenced herein are incorporated by reference thereto.

The recitation of numerical ranges by endpoints includes all integer numbers, and where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable compound, i.e. a compound that is sufficiently robust to survive isolation to a useful degree of purity from a reaction mixture. Suitable substituents can be selected from $C_{1-6}$alkyl, halogen, hydroxy, $C_{1-6}$alkoxy.

The term "$C_{1-20}$alkyl", as a group or part of a group, refers to a hydrocarbyl radical of Formula $C_nH_{2n+1}$ wherein n is a number ranging from 1 to 20. Generally, the alkyl groups comprise from 1 to 20 carbon atoms, preferably from 1 to 12 carbon atoms, preferably from 1 to 10 carbon atoms, preferably from 1 to 6 carbon atoms, more preferably 1, 2, 3, 4, 5, 6 carbon atoms. Alkyl groups may be linear, or branched and may be substituted as indicated herein. When a subscript is used herein following a carbon atom, the subscript refers to the number of carbon atoms that the named group may contain. Thus, for example, $C_{1-20}$alkyl groups include all linear, or branched alkyl groups having 1 to 20 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers, undecyl and its isomers, dodecyl and its isomers, tridecyl and its isomers, tetradecyl and its isomers, pentadecyl and its isomers, hexadecyl and its isomers, heptadecyl and its isomers, octadecyl and its isomers, nonadecyl and its isomers, icosyl and its isomers, and the like. For example, $C_{1-10}$alkyl includes all linear, or branched alkyl groups having 1 to 10 carbon atoms, and thus includes for example methyl, ethyl, n-propyl, propyl, 2-methyl-ethyl, butyl and its isomers (e.g.

n-butyl, i-butyl and t-butyl); pentyl and its isomers, hexyl and its isomers, heptyl and its isomers, octyl and its isomers, nonyl and its isomers, decyl and its isomers and the like. For example, $C_{1-6}$alkyl includes all linear, or branched alkyl groups having 1 to 6 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers. When the suffix "ene" is used in conjunction with an alkyl group, i.e. "alkylene", this is intended to mean the alkyl group as defined herein having two single bonds as points of attachment to other groups.

The term "$C_{1-6}$alkoxy" or "$C_{1-6}$alkyloxy", as a group or part of a group, refers to a group having the Formula —OR$^a$ wherein R$^a$ is $C_{1-6}$alkyl. Non-limiting examples of suitable $C_{1-6}$alkoxy include methoxy, ethoxy, propoxy, isopropoxy, butoxy, isobutoxy, sec-butoxy, tert-butoxy, pentyloxy and hexyloxy.

The term "$C_{3-6}$cycloalkyl", as a group or part of a group, refers to a cyclic alkyl group, that is to say, a monovalent, saturated, hydrocarbyl group having 1 or more cyclic structure, and comprising from 3 to 9 carbon atoms, more preferably from 3 to 8 carbon atoms, more preferably from 3 to 6 carbon atoms, still more preferably from 5 to 6 carbon atoms. Cycloalkyl includes all saturated hydrocarbon groups containing 1 or more rings, including monocyclic or bicyclic groups. The further rings of multi-ring cycloalkyls may be either fused, bridged and/or joined through one or more spiro atoms. Examples of $C_{3-6}$cycloalkyl groups include but are not limited to cyclopropyl, cyclobutyl, cyclopentyl, cyclohexyl. When the suffix "ene" is used in conjunction with a cycloalkyl group, i.e. cycloalkylene, this is intended to mean the cycloalkyl group as defined herein having two single bonds as points of attachment to other groups.

The term "$C_{6-30}$aryl", as a group or part of a group, refers to a polyunsaturated, aromatic hydrocarbyl group having a single ring (i.e. phenyl) or multiple aromatic rings fused together (e.g. naphthalene), or linked covalently, typically containing 6 to 30 atoms; wherein at least one ring is aromatic. Examples of suitable aryl include $C_{6-12}$aryl, more preferably $C_{6-10}$aryl. Non-limiting examples of $C_{6-12}$aryl comprise phenyl, biphenylyl, biphenylenyl, or 1- or 2-naphthanelyl. When the suffix "ene" is used in conjunction with an aryl group, this is intended to mean the aryl group as defined herein having two single bonds as points of attachment to other groups.

The term "halo" or "halogen", as a group or part of a group, is generic for fluoro, chloro, bromo or iodo.

The term "hydroxyl" or "hydroxy", as a group or part of a group, refers to the group —OH.

The terms described above and others used in the specification are well understood to those in the art.

Preferred statements (features) and embodiments of the compositions, polymers, processes, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered aspects and embodiments 1 to 22, with any other statement and/or embodiment.

1. A composition comprising:
   (a) at least one first polymer selected from the group consisting of poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer, and mixture thereof; and
   (b) at least one second polymer selected from the group consisting of poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof;
   wherein when the at least one first polymer is poly-L-lactide-polybutadiene (PLLA-PB) block copolymer, or poly-L-lactide-urethane-polybutadiene block copolymer, then the at least one second polymer is selected from the group consisting of poly-D-lactide, poly-D-lactide-polybutadiene (PDLA-PB) block copolymer, poly-D-lactide-urethane-polybutadiene block copolymer, poly-D-lactide-urethane, and mixture thereof; or
   wherein when the at least one first polymer is poly-D-lactide-polybutadiene block copolymer, or poly-D-lactide-urethane-polybutadiene block copolymer, then the at least one second polymer is selected from the group consisting of poly-L-lactide, poly-L-lactide-polybutadiene block copolymer, poly-L-lactide-urethane-polybutadiene block copolymer, poly-L-lactide-urethane, and mixture thereof.

2. A composition comprising:
   (a) at least one first polymer selected from the group consisting of poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer, and mixture thereof; and
   (b) at least one second polymer selected from the group consisting of poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof;
   wherein when the at least one first polymer is poly-L-lactide-polybutadiene (PLLA-PB) block copolymer, or poly-L-lactide-urethane-polybutadiene block copolymer, then the at least one second polymer is selected from the group consisting of poly-D-lactide, poly-D-lactide-polybutadiene (PDLA-PB) block copolymer, poly-D-lactide-urethane-polybutadiene block copolymer, poly-D-lactide-urethane, and mixture thereof; or
   wherein when the at least one first polymer is poly-D-lactide-polybutadiene block copolymer, or poly-D-lactide-urethane-polybutadiene block copolymer, then the at least one second polymer is selected from the group consisting of poly-L-lactide, poly-L-lactide-polybutadiene block copolymer, poly-L-lactide-urethane-polybutadiene block copolymer, poly-L-lactide-urethane, and mixture thereof;
   wherein said composition comprises from 40% to 99% by weight of said second polymer based on the total weight of the composition.

3. The composition according to any one of statements 1 or 2, wherein the at least one first polymer is poly-L-lactide-polybutadiene (PLLA-PB) block copolymer and the at least one second polymer is selected from poly-D-lactide, poly-D-lactide-polybutadiene (PDLA-PB) block copolymer, or mixture thereof.
4. The composition according to any one of statements 1 or 2, wherein the at least one first polymer is poly-D-lactide-polybutadiene (PDLA-PB) block copolymer and the at least one second polymer is selected from poly-L-lactide, poly-L-lactide-polybutadiene (PLLA-PB) block copolymer, or mixture thereof.
5. The composition according to any one of statements 1 to 4, wherein said poly-L-lactide-polybutadiene (PLLA-PB) block copolymer is selected from the group comprising PLLA-PB diblock copolymer, PLLA-PB-PLLA triblock copolymer, PLLA-PB multiblock copolymer, PLLA-PB star copolymers, PLLA-PB comb copolymers, PLLA-PB gradient containing block copolymers; and mixtures thereof.
6. The composition according to any one of statements 1 to 4, wherein said poly-D-lactide-polybutadiene (PDLA-PB) block copolymer is selected from the group comprising PDLA-PB diblock copolymer, PDLA-PB-PDLA triblock copolymer, PDLA-PB multiblock copolymer, PDLA-PB star copolymers, PDLA-PB comb copolymers, PDLA-PB gradient containing block copolymers; and mixtures thereof.
7. The composition according to any one of statements 1 to 6, wherein said composition comprises from 1 to 60% by weight of said first polymer based on the total weight of the composition; preferably, said composition comprises from 2 to 55% by weight of said first polymer based on the total weight of the composition.
8. The composition according to any one of statements 1, 3 to 7, wherein said composition comprises from 40% to 99% by weight of said second polymer based on the total weight of the composition.
9. The composition according to any one of statements 1 to 8, comprising from 1% to 60% by weight of poly-D-lactide-polybutadiene block copolymer based on the total weight of the composition; and from 40% to 99% by weight of the second polymer (b) based on the total weight of the composition;
and/or
from 1% to 60% by weight of poly-L-lactide-polybutadiene block copolymer based on the total weight of the composition; and from 40% to 99% by weight of the second polymer (b) based on the total weight of the composition.
10. The composition according to any one of statements 1 to 9, wherein the at least one first polymer is poly-L-lactide-polybutadiene (PLLA-PB) block copolymer and the at least one second polymer is poly-D-lactide-polybutadiene (PDLA-PB) block copolymer.
11. The composition according to any one of statements 1 to 9, wherein the at least one first polymer is poly-D-lactide-polybutadiene (PDLA-PB) block copolymer and the at least one second polymer is poly-L-lactide-polybutadiene (PLLA-PB) block copolymer.
12. A composition comprising at least one poly-L-lactide-polybutadiene (PLLA-PB) block copolymer and at least one poly-D-lactide-polybutadiene (PDLA-PB) block copolymer.
13. The composition according to statement 12, wherein said composition comprises from 1 to 60% by weight of said at least one poly-L-lactide-polybutadiene (PLLA-PB) block copolymer based on the total weight of the composition; preferably, said composition comprises from 2 to 55% by weight of said at least one poly-L-lactide-polybutadiene (PLLA-PB) block copolymer based on the total weight of the composition.
14. The composition according to any one of statements 12 to 13, wherein said composition comprises from 40% to 99% by weight of said at least one poly-D-lactide-polybutadiene (PDLA-PB) block copolymer based on the total weight of the composition; preferably, said composition comprises from 45 to 98% by weight of said at least one poly-D-lactide-polybutadiene (PDLA-PB) block copolymer based on the total weight of the composition.
15. A process for preparing a composition according to any one of statements 1 to 11 comprising the step of
contacting at least one first polymer with at least one second polymer,
wherein said at least one first polymer is selected from the group consisting of poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer, and mixture thereof; and
said at least one second polymer is selected from the group consisting of poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof;
wherein when the at least one first polymer is poly-L-lactide-polybutadiene (PLLA-PB) block copolymer, or poly-L-lactide-urethane-polybutadiene block copolymer, then the at least one second polymer is selected from the group consisting of poly-D-lactide, poly-D-lactide-polybutadiene (PDLA-PB) block copolymer, poly-D-lactide-urethane-polybutadiene block copolymer, poly-D-lactide-urethane, and mixture thereof, or
wherein when the at least one first polymer is poly-D-lactide-polybutadiene (PDLA-PB) block copolymer, or poly-D-lactide-urethane-polybutadiene block copolymer, then the at least one second polymer is selected from the group consisting of poly-L-lactide, or poly-L-lactide-polybutadiene (PLLA-PB) block copolymer, poly-L-lactide-urethane-polybutadiene block copolymer, poly-L-lactide-urethane, and mixture thereof.
16. The process according to statement 15, wherein said contacting step comprises melt blending the at least one first polymer with the at least one second polymer.
17. A process for preparing a composition according to any one of statements 12 to 14 comprising the step of contacting at least one poly-L-lactide-polybutadiene (PLLA-PB) block copolymer with at least one poly-D-lactide-polybutadiene (PDLA-PB) block copolymer.
18. The process according to any one of statements 15 to 17, wherein said composition is melt blended at a temperature ranging from 160° C. to 230° C., preferably at a temperature ranging from 160° C.-200° C.
19. The process according to any one of statements 15 to 18, comprising melt processing a blend comprising poly-L-lactide-polybutadiene (PLLA-PB) block copolymer and poly-D-lactide-polybutadiene (PDLA-PB) block copolymer to allow formation of PLLA/PDLA stereocomplex crystallites in the blend during the processing.
20. The process according to any one of statements 15 to 19, further comprising processing the composition using one or more polymer processing techniques selected from film, sheet, pipe and fiber extrusion or coextrusion; blow molding; injection molding; rotary molding; foaming; and thermoforming.

21. An article comprising a composition according to any one of statements 1 to 14, or formed using a process according to any one of statements 15 to 20.

22. Use of poly-L-lactide-polybutadiene (PLLA-PB) block copolymer, poly-D-lactide-polybutadiene (PDLA-PB) block copolymer, poly-L-lactide-urethane-polybutadiene block copolymer, or poly-D-lactide-urethane-polybutadiene block copolymer, as nucleating agent for polymers.

According to the first aspect, a composition is provided comprising:

(a) at least one first block copolymer selected from the group comprising poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer, and mixture thereof; and (b) at least one second polymer selected from the group comprising poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof;

wherein when the at least one first polymer is poly-L-lactide-polybutadiene (PLLA-PB) block copolymer, or poly-L-lactide-urethane-polybutadiene block copolymer, then the at least one second polymer is selected from the group comprising poly-D-lactide, poly-D-lactide-polybutadiene (PDLA-PB) block copolymer, poly-D-lactide-urethane-polybutadiene block copolymer, poly-D-lactide-urethane, and mixture thereof, or wherein when the at least one first polymer is poly-D-lactide-polybutadiene block copolymer, or poly-D-lactide-urethane-polybutadiene block copolymer, then the at least one second polymer is selected from the group comprising poly-L-lactide, poly-L-lactide-polybutadiene block copolymer, poly-L-lactide-urethane-polybutadiene block copolymer, poly-L-lactide-urethane, and mixture thereof.

In particular, according to the first aspect, a composition is provided comprising (a1) at least one first block copolymer selected from poly-L-lactide-polybutadiene (PLLA-PB) block copolymer, poly-L-lactide-urethane-polybutadiene block copolymer, or mixture thereof, and (b1) at least one second polymer selected from the group consisting of poly-D-lactide, poly-D-lactide-polybutadiene (PDLA-PB) block copolymer, poly-D-lactide-urethane-polybutadiene block copolymer, poly-D-lactide-urethane, and mixture thereof;

and/or (a2) at least one first block copolymer selected from poly-D-lactide-polybutadiene (PDLA-PB) block copolymer, poly-D-lactide-urethane-polybutadiene block copolymer, or a mixture thereof, and (b2) at least one second polymer selected from the group consisting of poly-L-lactide, poly-L-lactide-polybutadiene (PLLA-PB) block copolymer, poly-L-lactide-urethane-polybutadiene block copolymer, poly-L-lactide-urethane, and mixture thereof.

Preferably, the composition comprises:

(a1) poly-L-lactide-polybutadiene (PLLA-PB) block copolymer and (b1) at least one second polymer selected from poly-D-lactide, poly-D-lactide-polybutadiene (PDLA-PB) block copolymer, or mixture thereof;

and/or (a2) poly-D-lactide-polybutadiene (PDLA-PB) block copolymer, and (b2) at least one second polymer selected from poly-L-lactide, poly-L-lactide-polybutadiene (PLLA-PB) block copolymer, or mixture thereof.

Preferably, the composition comprises:

(a1) poly-L-lactide-polybutadiene (PLLA-PB) block copolymer and (b1) at least one second polymer selected from poly-D-lactide, poly-D-lactide-polybutadiene (PDLA-PB) block copolymer, or mixture thereof;

and/or (a2) poly-D-lactide-polybutadiene (PDLA-PB) block copolymer, and (b2) at least one second polymer selected from poly-L-lactide, poly-L-lactide-polybutadiene (PLLA-PB) block copolymer, or mixture thereof.

Preferably, the composition comprises:

(a1) poly-L-lactide-polybutadiene (PLLA-PB) block copolymer and (b1) at least one second polymer selected from poly-D-lactide, poly-D-lactide-polybutadiene (PDLA-PB) block copolymer, or mixture thereof;

or (a2) poly-D-lactide-polybutadiene (PDLA-PB) block copolymer, and (b2) at least one second polymer selected from poly-L-lactide, poly-L-lactide-polybutadiene (PLLA-PB) block copolymer, or mixture thereof.

The present composition comprises (a) at least one first block copolymer selected from the group comprising, consisting essentially of, or consisting of poly-L-lactide-polybutadiene (PLLA-PB) block copolymer, poly-D-lactide-polybutadiene (PDLA-PB) block copolymer, poly-L-lactide-urethane-polybutadiene block copolymer, and poly-D-lactide-urethane-polybutadiene block copolymer.

Suitable block copolymer comprises polymer comprising multiple sequences, or blocks, of the same monomer alternating in series with different monomer blocks; these blocks are covalently bound to each other. Block copolymers are normally prepared by controlled polymerization of one monomer, followed by chain extension with a different monomer. Block copolymers are classified based on the number of blocks they contain and how the blocks are arranged. For example, block copolymers with two blocks are called diblocks; those with three blocks are triblocks; and those with more than three are generically called multiblocks. Classifications by arrangement include the linear, or end-to-end, arrangement and the star arrangement, in which one polymer is the base for multiple branches.

In an embodiment, said block copolymer is selected from diblock copolymer, triblock copolymer, multiblock copolymer, star copolymers, comb copolymers, gradient containing block copolymers, and other copolymers having a blocky structure, which will be known by those skilled in the art. Preferred are diblock and triblock copolymers. An example of a gradient containing block copolymer is when the monomer or monomers used from one segment are allowed to further react as a minor component in the next sequential segment. For example, if the monomer mix used for the 1st block (A block) of an AB diblock copolymer is polymerized to only 80% conversion, then the remaining 20% of the unreacted monomer is allowed to react with the new monomers added for the B block segment, the result is an AB diblock copolymer in which the B segment contains a gradient of the A segment composition. The term "comb copolymer," as used herein, describes a type of graft copolymer, wherein the polymeric backbone of the graft copolymer is linear or essentially linear and is made of one polymer A, and each side chain (graft segment) of the graft copolymer is formed by a polymer B that is grafted to the polymer A backbone. Used herein, the terms "comb copolymer" and "graft copolymer" have the same meaning.

In an embodiment, said poly-L-lactide-polybutadiene (PLLA-PB) block copolymer is selected from the group comprising PLLA-PB diblock copolymer, PLLA-PB-PLLA triblock copolymer, PLLA-PB multiblock copolymer, PLLA-PB star copolymers, PLLA-PB comb copolymers, and PLLA-PB gradient containing block copolymers. Preferable diblock and triblock copolymers include PLLA-PB and PLLA-PB-PLLA block copolymers.

In an embodiment, said poly-D-lactide-polybutadiene (PDLA-PB) block copolymer is selected from the group comprising PDLA-PB diblock copolymer, PDLA-PB-PDLA triblock copolymer, PDLA-PB multiblock copolymer, PDLA-PB star copolymers, PDLA-PB comb copolymers, and PDLA-PB gradient containing block copolymers. Preferable diblock and triblock copolymers include PDLA-PB and PDLA-PB-PDLA block copolymers.

In an embodiment, the poly-L-lactide-polybutadiene block copolymer or poly-D-lactide-polybutadiene block copolymer is produced by combining an L-lactide or a D-lactide, respectively, with a polybutadiene, preferably a hydroxy functionalized polybutadiene. In one or more embodiments, the block copolymer is produced by melt blending an L-lactide or a D-lactide and a hydroxy functionalized polybutadiene. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

As used herein the term "L-lactide" or "L-L-lactide" refers to (S,S)-lactide and is the cyclic di-ester of two lactic acid S enantiomers.

As used herein the term "D-lactide" or "D-D-lactide" refers to (R,R)-lactide and is a cyclic di-ester of two lactic acid R enantiomers.

In some embodiments, it is desirable to use lactide stereochemistry DD or LL having an optical purity also called isomeric purity L- or D of at least 90% by weight, preferably at least 95%, at least 98%, at least 99%, at least 99.7% by weight. An isomeric purity of at least 99.8% by weight is preferred.

Preferably, the L-lactide comprises less than 0.5% of D-lactide, preferably less than 0.2%.

Preferably, the D-lactide comprises less than 0.5% of L-lactide, preferably less than 0.2%.

Among the hydroxyl-terminated polybutadienes that are useful for preparing the block copolymers are those possessing a number average molecular weight (Mn) of at least 1000 g/mol, for example at least 5000 g/mol, preferably at least 10000 g/mol. In some embodiments the hydroxyl-terminated polybutadienes possess a Mn ranging from 1000 to 20000 g/mol, for example from 5000 to 25000 g/mol, and advantageously from 8000 to 20000 g/mol, and advantageously from 9000 to 20000 g/mol, and advantageously from 10000 to 20000 g/mol. Among the hydroxyl-terminated polybutadienes that are useful for preparing the block copolymers are those possessing a hydroxyl group content of from 0.10 to 3.0 Mmol/g.

Hydroxyl-terminated polybutadienes of the above-described type, averaging more than one predominantly primary hydroxyl group per molecule, e.g., averaging from 1.5 to 3 or more primary hydroxyl groups per molecule, can be suitably employed herein. Branched hydroxyl-terminated polybutadienes can possess an average of at least 1.90, and advantageously from 1.95 up to 2.8, hydroxyl groups per molecule, the hydroxyl groups being predominantly in terminal positions on the main, i.e., the terminal hydroxyl groups of the polymer, are bonded to carbon atoms adjacent to double bonded carbon atoms.

The useful hydroxyl-terminated polybutadienes herein can also incorporate one or more other copolymerizable monomers that can confer particularly desirable properties upon the copolymers herein and the compositions prepared therewith. Included among the copolymerizable monomers are mono-olefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, isocyanate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Hydroxyl-terminated polybutadienes possessing these characteristics are commercially available from several sources and are therefore conveniently employed herein.

Examples of suitable hydroxyl-terminated polybutadiene include but are not limited to Krasol® LBH 10000, Krasol® LBH 2000, Krasol® LBH 3000 and Krasol® LBH 5000, Krasol® LBH-P 2000, Krasol® LBH-P 3000, Krasol® LBH-P 5000, Poly Bd® R45HTLO, Poly Bd® R20LM commercially available from HSC Cray Valley Corp., as well as the epoxidized hydroxyl-terminated polybutadiene such as Poly Bd® 605 and Poly Bd® 600 commercially available from HSC Cray Valley Corp.

In an embodiment, said block copolymer comprises at least 10% by weight of hydroxyl functionalized polybutadiene based on the total weight of the block copolymer. In an embodiment, said block copolymer comprises from 10% to 90% by weight of hydroxyl functionalized polybutadiene based on the total weight of the block copolymer.

The present invention is directed towards the use of such block copolymers (a) as nucleating agent to induce the crystallization of the second polymer (b).

The present invention is also directed towards the use of such block copolymers (a) as impact modifier to improve the impact strength of the second polymer (b).

The present invention is also directed towards the use of such block copolymers (a) to prepare together with the second polymer (b), a stereocomplex.

In some embodiments, the composition may comprise from 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer based on the total weight of the composition.

In an embodiment, said at least one first polymer (a) is poly-L-lactide-polybutadiene (PLLA-PB) block copolymer and the at least one second polymer (b) is selected from poly-D-lactide, poly-D-lactide-polybutadiene (PDLA-PB) block copolymer, poly-D-lactide-urethane-polybutadiene block copolymer, poly-D-lactide-urethane, or mixture thereof, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer (a) based on the total weight of the composition.

In an embodiment, said at least one first polymer (a) is poly-D-lactide-polybutadiene (PDLA-PB) block copolymer and the at least one second polymer (b) is selected from poly-L-lactide, poly-L-lactide-polybutadiene (PLLA-PB) block copolymer, poly-D-lactide-urethane-polybutadiene block copolymer, poly-D-lactide-urethane, or mixture thereof, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer (a) based on the total weight of the composition.

In an embodiment, said at least one first polymer (a) is poly-L-lactide-polybutadiene (PLLA-PB) block copolymer and the at least one second polymer (b) is selected from poly-D-lactide, poly-D-lactide-polybutadiene (PDLA-PB) block copolymer, or mixture thereof, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer (a) based on the total weight of the composition.

In an embodiment, said at least one first polymer (a) is poly-D-lactide-polybutadiene (PDLA-PB) block copolymer and the at least one second polymer (b) is selected from poly-L-lactide, poly-L-lactide-polybutadiene (PLLA-PB) block copolymer, or mixture thereof, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer (a) based on the total weight of the composition.

In a preferred embodiment, said at least one first polymer (a) is poly-D-lactide-polybutadiene (PDLA-PB) block copolymer and the at least one second polymer (b) is poly-L-lactide, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer based on the total weight of the composition.

In a preferred embodiment, said at least one first polymer (a) is poly-L-lactide-polybutadiene (PLLA-PB) block copolymer and the at least one second polymer (b) is poly-D-lactide, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer based on the total weight of the composition.

In an embodiment, said at least one first polymer (a) is poly-D-lactide-polybutadiene (PDLA-PB) block copolymer and the at least one second polymer (b) is poly-L-lactide-polybutadiene (PLLA-PB) block copolymer, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer based on the total weight of the composition.

In an embodiment, said at least one first polymer (a) is poly-L-lactide-polybutadiene (PLLA-PB) block copolymer and the at least one second polymer (b) is poly-D-lactide-polybutadiene (PDLA-PB) block copolymer, preferably wherein the composition comprises 1% to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer based on the total weight of the composition.

In an embodiment, said at least one first polymer is poly-L-lactide-urethane-polybutadiene block copolymer, or poly-D-lactide-urethane-polybutadiene block copolymer.

Poly-L-lactide-urethane-polybutadiene block copolymer, or poly-D-lactide-urethane-polybutadiene block copolymer, can be respectively prepared by contacting an L-lactide or a D-lactide, respectively, with a polybutadiene, preferably a hydroxy functionalized polybutadiene, thereby obtaining polylactide-polybutadiene block copolymer, and contacting said block copolymer with a diisocyanate compound and optionally a diamine or a dialcohol to form a poly-L-lactide urethane-polybutadiene block copolymer. The dihydroxyl alcohol or diamine can be used as initiator.

Non-limiting examples of suitable diamine initiators include 1,4-diaminobutane, 1,6-diaminohexane, 1,4-diaminocyclohexane, 1,4-diaminophenyl, 4,4'-diaminodiphenylmethane. Preferably, the 1,4-diaminophenyl, 4,4'-diaminodiphenylmethane is used.

The following alcohols can be used as initiator: 1,3-propanediol, 1,3-butanediol, 1,4-butanediol, 1,6-hexanediol, 1,7-heptanediol, 1,8-octanediol, xylene glycol.

Suitable diisocyanate compounds include compounds of formula: O=C=N—L$^1$—N=C=O wherein L$^1$ can be aliphatic or aromatic. Preferably L$^1$ is selected from the group comprising C$_{4-20}$alkylene, C$_{4-6}$cycloalkylene, C$_{6-12}$arylene, C$_{6-12}$arylene-C$_{6-12}$arylene, C$_{6-12}$aryleneC$_{1-6}$alkyleneC$_{6-12}$arylene, C$_{4-6}$cycloalkyleneC$_{1-6}$alkyleneC$_{4-6}$cycloalkylene; each group being optionally substituted. For example L$^1$ can be hexamethylene, dicyclohexylmethane, diphenylmethane and the like, Non-limiting examples of suitable diisocyanates which may be used include aliphatic isocyanates such as hexamethylene diisocyanate; and aromatic isocyanates such as diphenylmethane diisocyanate (MDI) in the form of its 2,4', 2,2' and 4,4' isomers and mixtures thereof, the mixtures of diphenylmethane diisocyanates (MDI) and oligomers thereof, m- and p-phenylene diisocyanate, tolylene-2,4- and tolylene-2,6-diisocyanate (also known as toluene diisocyanate) in any suitable isomer mixture, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane (e.g. 4,4'-diisocyanatodicyclohexylmethane (H12MDI)), isophorone diisocyanate (IPDI), butylene diisocyanate, trimethylhexamethylene diisocyanate, isocyanatomethyl-1,8-octane diisocyanate, tetramethylxylene diisocyanate (TMXDI), 1,4-cyclohexane-diisocyanate (CD), and tolidine diisocyanate (TODD; any mixture thereof.

The present composition also comprises at least one second polymer (b) selected from the group comprising, consisting essentially of, or consisting of poly-L-lactide, poly-L-lactide-polybutadiene (PLLA-PB) block copolymer, poly-L-lactide-urethane-polybutadiene block copolymer, poly-L-lactide-urethane, poly-D-lactide, poly-D-lactide-polybutadiene (PDLA-PB) block copolymer, poly-D-lactide-urethane-polybutadiene block copolymer, poly-D-lactide-urethane, and mixture thereof.

The composition may comprise from 40% to 99% by weight of said second polymer (b) based on the total weight of the composition. For example, the composition may comprise 45 to 98% by weight of said second polymer (b) based on the total weight of the composition; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of said at least one second polymer (b) based on the total weight of the composition.

In a preferred embodiment, said at least one second polymer is poly-L-lactide, when the first polymer is poly-D-lactide-polybutadiene (PDLA-PB) block copolymer. In a preferred embodiment, said at least one second polymer is poly-L-lactide when the first polymer is poly-L-lactide-polybutadiene (PLLA-PB) block copolymer.

As used herein, the terms "polylactic acid" or "polylactide" or "PLA" are used interchangeably and refer to poly (lactic acid) polymers comprising repeat units derived from lactic acid.

Polylactic acid suitable for the composition can be prepared according to any method known in the state of the art. The polylactic acid can be prepared by ring-opening polymerization of raw materials having required structures selected from lactide, which is a cyclic dimer of lactic acid, glycolide, which is a cyclic dimer of glycolic acid, and caprolactone and the like. Lactide includes L-lactide, which is a cyclic dimer of L-lactic acid, D-lactide, which is a cyclic dimer of D-lactic acid, meso-lactide, which is a cyclic dimer of D-lactic acid and L-lactic acid, and DL-lactide, which is a racemate of D-lactide and L-lactide. Random copolymers made from meso-lactide result in an atactic primary structure referred to as poly(meso-lactide) and are amorphous. Random optical copolymers made from equimolar amounts of D-lactide and L-lactide are referred to as poly-DL-lactide (PDLLA) or poly(rac-lactide) and are also amorphous.

The PLLA (poly-L-lactide) suitable for the invention comprises the product of a polymerization reaction of mainly L-lactides (or L,L-lactides). Other suitable PLLA can be copolymers of PLLA with some D lactic acid units. The term "poly-L-lactide (PLLA)" refers to the isotactic polymer with the general structure (I):

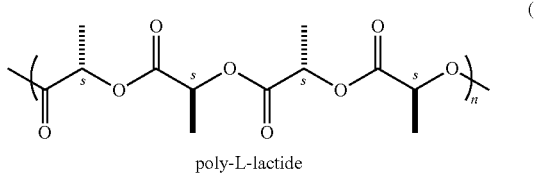

poly-L-lactide

The PDLA (poly-D-lactide) for use in the present invention comprises the product of a polymerization reaction of mainly D-lactides. Other suitable PDLA can be copolymers of PDLA with some L lactic acid units. The term "poly-D-lactide (PDLA)" refers to the enantiomer of PLLA.

The polylactic acid for use in the present composition also includes copolymers of lactic acid. For instance, copolymers of lactic acid and trimethylene carbonate according to EP 11167138 and copolymers of lactic acid and urethanes according to WO 2008/037772 and PCT application number PCT/EP2011/057988. Copolymeric components other than lactic acid may be used and include dicarboxylic acid, polyhydric alcohol, hydroxycarboxylic acid, lactone, or the like, which have two or more functional groups each capable of forming an ester bonding. These are, for example, polyester, polyether, polycarbonate, or the like which have the two or more unreacted functional groups in a molecule. The hydroxycarboxylic acids may be selected from the list comprising glycolic acid, hydroxybutyric acid, hydroxyvaleric acid, hydroxypentanoic acid, hydroxycaproic acid, and hydroxyheptanoic acid. In an embodiment no comonomer is used.

In an embodiment, the PLLA and/or the PDLA respectively have an optical purity (called isomeric purity) of the L or D isomer, which is higher than 90% of the PLA, preferably higher than 92% of the PLA, preferably higher than 95 w % by weight. An optical purity from at least 98% by weight is more preferred, yet more preferably from at least 99%.

Optical purity can be measured by different techniques, such as NMR, polarimetry or by enzymatic method or GCMS. Preferably, optical purity is measured by enzymatic method and/or NMR, as described for herein below. Enzymatic method: The stereochemical purity of the PLLA or of the PDLA can be determined from the respective content of L-mer or of D-mer. The terms "content of D-mer" and "content of L-mer" refer respectively to the monomer units of type D and of type L that occur in polylactide, using the enzymatic method. The principle of the method is as follows: The L-lactate and D-lactate ions are oxidized to pyruvate respectively by the enzymes L-lactate dehydrogenase and D-lactate dehydrogenase using nicotinamide-adenine dinucleotide (NAD) as coenzyme. To force the reaction in the direction of formation of pyruvate, it is necessary to trap this compound by reaction with hydrazine. The increase in optical density at 340 nm is proportional to the amount of L-lactate or of D-lactate present in the sample. The samples of PLA can be prepared by mixing 25 ml of sodium hydroxide (1 mol/L) with 0.6 g of PLA. The solution was boiled for 8 h and then cooled. The solution was then adjusted to neutral pH by adding hydrochloric acid (1 mol/L), then deionized water was added in a sufficient amount to give 200 ml. The samples were then analyzed on a Vital Scientific Selectra Junior analyzer using, for L-mer determination of poly-L-lactide acid, the box titled "L-lactic acid 5260" marketed by the company Scil and for D-mer determination of poly-D-lactide acid, the box titled "L-lactic acid 5240" marketed by the company Scil. During the analysis, a reactive blank and calibration using the calibrant "Scil 5460" are used. The presence of insertion and racemization defects can also be determined by carbon-13 nuclear magnetic resonance (NMR) (Avance, 500 MHz, 10 mm SELX probe). The samples can be prepared from 250 mg of PLA dissolved in 2.5 to 3 ml of $CDCl_3$.

In an embodiment, the PLLA suitable for the invention comprises a content of D isomer of at most 20% by weight, preferably of at most 10% by weight, preferably of at most 8% by weight, preferably of at most 5% by weight, more preferably of at most 2% by weight, most preferably of at most 1% by weight of the PLLA.

In an embodiment, the PDLA suitable for the invention comprises a content of L isomer of at most 20% by weight, preferably of at most 10% by weight, preferably of at most 8% by weight, preferably of at most 5% by weight, preferably of at most 2% by weight of the PDLA more preferably of at most 1% by weight of the PDLA.

Preferably, the PLLA and/or PDLA suitable for the invention can have high molecular weights. In a preferred embodiment, the PLLA and/or the PDLA for the invention have a weight average molecular weight (Mw) of at least 40 kDa, preferably at least 100 kDa, for example at least 150 kDa. Measurement of the molecular masses may be performed at 25° C. using a liquid chromatograph WATERS 610. Firstly, a polymer solution is prepared in chloroform (1 mg polymer/ml). Then, 100 µl of this solution is taken and injected, through a filter (with pores of 0.2 µm diameter, on the chromatograph column at 25° C. Molecular masses are determined from the retention time in the column, translated in mass equivalent using a universal calibration law based on polystyrene standards. For example, ASTM practice D3016-97(2010) may be used. In an embodiment, the ratio of the weight average molecular weight (Mw) to the number average molecular weight (Mn) is generally from 1.0 to 5.0.

Preferably, PLLA and/or PDLA suitable the invention, has a number average molecular weight (Mn) ranging from 40000 to 350000 g/mol, more preferably from 50000 to 175000 g/mol, even more preferably from 60000 to 150000 g/mol. The weight average and number average molecular weight were measured by chromatography by gel permeation compared to a polystyrene standard in chloroform at 25° C.

In an embodiment, the ratio of the weight average molecular weight (Mw) to the number average molecular weight (Mn) is generally between 1.2 and 5.0 for the PLLA and/or PDLA used for preparing block copolymers.

In an embodiment, the polylactic acid may have a density of from 1.228 $g/cm^3$ to 1.269 $g/cm^3$, for example from 1.230 $g/cm^3$ to 1.260 $g/cm^3$, for example from 1.235 $g/cm^3$ to 1.255 $g/cm^3$ as determined in accordance with ASTM D792.

In an embodiment, the polylactic acid may exhibit a crystalline melt temperature (Tc) of from 140° C. to 190° C., for example from 145° C. to 185° C., for example from 170° C. to 180° C. as determined in accordance with ASTM D3418.

In an embodiment, the polylactic acid may exhibit a glass transition temperature (Tg) of from 45° C. to 85° C., for example from 50° C. to 80° C., for example from 50° C. to 70° C. as determined in accordance with ASTM D3417.

In an embodiment, the polylactic acid may exhibit a melt flow rate ranging from 1 to 100 g/600 s, preferably 2 to 50 g/600 s, for example 3 to 12 g/600 s, wherein the Melt Flow Rate is measured according to ISO 1133 at 190° C. under a load of 2.16 kg.

For example, a process for preparing PLLA and/or PDLA suitable for the invention comprises the step of contacting at least one L-lactide or D-lactide, respectively, with a suitable catalyst, and optionally in the presence of a co-initiator. The process may be performed with or without solvent.

The catalyst employed by the process may have general formula $M(Y^1, Y^2, \ldots Y^p)_q$, in which M is a metal selected from the group comprising the elements of columns 3 to 12 of the periodic table of the elements, as well as the elements Al, Ga, In, Tl, Ge, Sn, Pb, Sb, Ca, Mg and Bi; whereas $Y^1, Y^2, \ldots Y^p$ are each substituents selected from the group comprising alkyl with 1 to 20 carbon atoms, aryl having from 6 to 30 carbon atoms, alkoxy having from 1 to 20 carbon atoms, aryloxy having from 6 to 30 carbon atoms, and other oxide, carboxylate, and halide groups as well as elements of group 15 and/or 16 of the periodic table; p and q are integers of from 1 to 6. As examples of suitable catalysts, we may notably mention the catalysts of Sn, Ti, Zr, Zn, and Bi; preferably an alkoxide or a carboxylate and more preferably $Sn(Oct)_2$, $Ti(OiPr)_4$, $Ti(2\text{-ethylhexanoate})_4$, $Ti(2\text{-ethylhexyloxide})_4$, $Zr(OiPr)_4$, $Bi(neodecanoate)_3$, (2,4-di-tert-butyl-6-(((2-(dimethylamino)ethyl)(methyl)amino)methyl)phenoxy)(ethoxy)zinc, or $Zn(lactate)_2$.

In an embodiment, the PLLA and/or PDLA suitable for the invention can be obtained by polymerizing L-lactide, or D-lactide, respectively, preferably in the presence of a co-initiator of formula (IV),

$$R^{10}\text{—OH} \qquad \qquad (IV)$$

wherein $R^{10}$ is selected from the group consisting of $C_{1-20}$alkyl, $C_{6-30}$aryl, and $C_{6-30}$aryl$C_{1-20}$alkyl optionally substituted by one or more substituents selected from the group consisting of halogen, hydroxyl, and $C_{1-6}$alkyl. Preferably, $R^{10}$ is selected from $C_{3-12}$alkyl, $C_{6-10}$aryl, and $C_{6-10}$aryl$C_{3-12}$alkyl, optionally substituted by one or more substituents, each independently selected from the group consisting of halogen, hydroxyl, and $C_{1-6}$alkyl; preferably, $R^{10}$ is selected from $C_{3-12}$alkyl, $C_{6-10}$aryl, and $C_{6-10}$aryl$C_{3-12}$alkyl, optionally substituted by one or more substituents, each independently selected from the group consisting of halogen, hydroxyl and $C_{1-4}$alkyl. The initiator can be an alcohol. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol.

In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol, 1,4-benzenedimethanol, and (4-trifluoromethyl) benzyl alcohol; preferably, said compound of formula (IV) is selected from 1-octanol, isopropanol, and 1,4-butanediol.

The polymerization can be performed at a temperature of 60° C.-200° C. The temperature is preferably that of the reaction itself. According to an embodiment, without solvent, the polymerization can be performed at a temperature of 110° C.-190° C. in bulk.

In an embodiment, the at least one second polymer (b) can be poly-L-lactide-polyurethane, or poly-D-lactide-polyurethane, or mixture thereof. Non-limiting examples of suitable poly-L-lactide-urethane and poly-D-lactide-urethane are described in WO2010/133419 hereby incorporated by reference.

In an embodiment, the at least one second polymer (b) can be poly-L-lactide-polybutadiene (PLLA-PB) block copolymer, or poly-D-lactide-polybutadiene (PDLA-PB) block copolymer, or mixture thereof.

The description of poly-L-lactide-polybutadiene (PLLA-PB) block copolymer, or poly-D-lactide-polybutadiene (PDLA-PB) block copolymer, for the first polymer (a) applies mutatis mutandis to the poly-L-lactide-polybutadiene (PLLA-PB) block copolymer, or poly-D-lactide-polybutadiene (PDLA-PB) block copolymer, used as second polymer (b). In an embodiment, said poly-L-lactide-polybutadiene (PLLA-PB) block copolymer is selected from the group comprising PLLA-PB diblock copolymer, PLLA-PB-PLLA triblock copolymer, PLLA-PB multiblock copolymer, PLLA-PB star copolymers, PLLA-PB comb copolymers, PLLA-PB gradient containing block copolymers. Preferable diblock and triblock copolymers include PLLA-PB and PLLA-PB-PLLA block copolymers. In an embodiment, said poly-D-lactide-polybutadiene (PDLA-PB) block copolymer is selected from the group comprising PDLA-PB diblock copolymer, PDLA-PB-PDLA triblock copolymer, PDLA-PB multiblock copolymer, PDLA-PB star copolymers, PDLA-PB comb copolymers, PDLA-PB gradient containing block copolymers. Preferable diblock and triblock copolymers include PDLA-PB and PDLA-PB-PDLA block copolymers.

Preferably, the composition comprises:

(a1) poly-L-lactide-polybutadiene (PLLA-PB) block copolymer and (b1) at least one second polymer selected from poly-D-lactide, or poly-D-lactide-polybutadiene (PDLA-PB) block copolymer; preferably wherein the composition comprises from 40% to 99% by weight of said second polymer (b1) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of said at least one second polymer (b1) based on the total weight of the composition;

and/or (a2) poly-D-lactide-polybutadiene (PDLA-PB) block copolymer, and (b2) at least one second polymer selected from poly-L-lactide, or poly-L-lactide-polybutadiene (PLLA-PB) block copolymer; preferably wherein the composition comprises from 40% to 99% by weight of said second polymer (b2) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of said at least one second polymer (b2) based on the total weight of the composition.

Preferably, the composition comprises:

(a1) poly-L-lactide-polybutadiene (PLLA-PB) block copolymer and (b1) at least one second polymer selected from poly-D-lactide, or poly-D-lactide-polybutadiene (PDLA-PB) block copolymer; preferably wherein the composition comprises 1 to 60% by weight of said first polymer (a1) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer (a1) based on the total weight of the composition; and preferably wherein the composition comprises from 50 to 98% by weight of said second polymer (b1) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of said at least one second polymer (b1) based on the total weight of the composition;

and/or (a2) poly-D-lactide-polybutadiene (PDLA-PB) block copolymer, and (b2) at least one second polymer selected from poly-L-lactide, or poly-L-lactide-polybutadiene (PLLA-PB) block copolymer; preferably wherein the composition comprises 1% to 60% by weight of said first polymer (a2) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one first polymer based on the total weight of the composition; and preferably wherein the composition comprises from 40% to 99% by weight of said second polymer (b2) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of said at least one second polymer (b2) based on the total weight of the composition.

In an embodiment, said at least one second polymer is poly-L-lactide-polybutadiene (PLLA-PB) block copolymer. In an embodiment, said at least one second polymer is poly-D-lactide-polybutadiene (PDLA-PB) block copolymer.

In a preferred embodiment, said at least one second polymer is poly-L-lactide. In a preferred embodiment, said at least one second polymer is poly-D-lactide.

Preferably, the composition comprises:

(a1) poly-L-lactide-polybutadiene (PLLA-PB) block copolymer and (b1) poly-D-lactide; preferably wherein the composition comprises 1% to 60% by weight of said block copolymer (a1) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one block polymer based on the total weight of the composition; and preferably wherein the composition comprises from 40% to 99% by weight of said poly-D-lactide (b1) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of said poly-D-lactide (b1) based on the total weight of the composition;

and/or (a2) poly-D-lactide-polybutadiene (PDLA-PB) block copolymer, and (b2) at least one second polymer selected poly-L-lactide; preferably wherein the composition comprises 1% to 60% by weight of said block copolymer (a2) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of said at least one block copolymer based on the total weight of the composition; and preferably wherein the composition comprises from 40% to 99% by weight of said poly-L-lactide (b2) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of said poly-L-lactide (b2) based on the total weight of the composition.

In an embodiment, the composition comprises:
from 1% to 60% by weight of poly-D-lactide-polybutadiene block copolymer based on the total weight of the composition; and from 40% to 99% by weight of the second polymer (b1) selected from poly-L-lactide, or poly-L-lactide-polybutadiene block copolymer based on the total weight of the composition;
and/or
from 1% to 60% by weight of poly-L-lactide-polybutadiene block copolymer based on the total weight of the composition; and from 40% to 99% by weight of the second polymer (b2) selected from poly-D-lactide, or poly-D-lactide-polybutadiene block copolymer based on the total weight of the composition.

In an embodiment, the composition comprises:
(i) from 1% to 60% by weight of poly-D-lactide-polybutadiene block copolymer based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of poly-D-lactide-polybutadiene block copolymer based on the total weight of the composition; and
(ii) from 40% to 99% by weight of poly-L-lactide-polybutadiene block copolymer based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of poly-L-lactide-polybutadiene block copolymer based on the total weight of the composition.

In an embodiment, the composition comprises:
(i) from 1% to 60% by weight of poly-L-lactide-polybutadiene block copolymer based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 40% to 55% by weight, for example from 40% to 50% by weight, for example from 45% to 50% by weight of poly-L-lactide-polybutadiene block copolymer based on the total weight of the composition; and
(ii) from 40% to 99% by weight of poly-D-lactide-polybutadiene block copolymer based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 60% by weight, for example from 50% to 60% by weight, for example from 45% to 55% by weight, for example from 50% to 55% by weight of poly-D-lactide-polybutadiene block copolymer based on the total weight of the composition.

According to the second aspect, the present invention also encompasses a process for preparing a composition according to the present invention, comprising the step of: contacting at least one first polymer with at least one second polymer,
wherein the (a1) at least one first block copolymer is selected from poly-L-lactide-polybutadiene (PLLA-PB) block copolymer or poly-L-lactide-urethane-polybutadiene block copolymer, or mixture thereof, and (b1) the at least one second polymer is selected from poly-D-lactide, poly-D-lactide-polybutadiene (PDLA-PB) block copolymer, or mixture thereof;

and/or (a2) the at least one first block copolymer is selected from poly-D-lactide-polybutadiene (PDLA-PB) block copolymer, poly-D-lactide-urethane-polybutadiene block copolymer, or a mixture thereof, and (b2) the at least one second polymer is selected from poly-L-lactide, poly-L-lactide-polybutadiene (PLLA-PB) block copolymer, or mixture thereof.

Any process known in the art can be applied for preparing a composition as presently described.

In some embodiments, said contacting step comprises melt blending the at least one first polymer with the at least one second polymer. In some embodiments, said melt blending process occurs, in a single step. The blending may occur by introducing the first polymer and the second polymer, into a system capable of combining and melting the components to initiate chemical and/or physical interactions between the first and second polymer components. For example, the blending may be accomplished by introducing the first and second polymers into a batch mixer, continuous mixer, single screw extruder or twin screw extruder, for example, to form a homogeneous mixture or solution while providing temperature conditions so as to melt the blend components and initiate chemical and physical interactions the first and second polymer components as described above.

In an embodiment, the composition is prepared by extrusion. In an embodiment, the composition is extruded at a temperature of at least 140° C., for example at least 150° C., for example at least 160° C., for example ranging from 160° C. to 230° C. More preferably, the composition is extruded at a temperature ranging from 180° C. to 230° C.

In another embodiment, said contacting step comprises melt processing a blend comprising the at least one first polymer with the at least one second polymer to allow formation of stereocomplex crystallites in the blend during the processing.

As used herein, the term "stereocomplex" refers to an interlocking composite prepared with two complementary polymeric structures, and which possesses different physical characteristics from the individual polymers. The term "complementary" structures can refer to two polymers that are homopolymers of the individual enantiomers of an optically active molecule such that each polymer is optically active. "Complementary" can also refer to two polymers that bear similar but not identical chemical structures in which case the polymers relate to one another as diasteromers rather than enantiomers. Even further, "complementary" can even refer to unrelated but optically active polymers of opposite polarity that are capable of forming stereocomplexes in which case the stereocomplex is called a "heterostereocomplex".

In a preferred embodiment, said contacting step comprises melt processing a blend comprising poly-D-lactide-polybutadiene (PLLA-PB) block copolymer and poly-L-lactide; or poly-L-lactide-polybutadiene (PLLA-PB) block copolymer to allow formation of stereocomplex crystallites in the blend during the processing.

In a preferred embodiment, said contacting step comprises melt processing a blend comprising poly-L-lactide-polybutadiene (PLLA-PB) block copolymer and poly-D-lactide or poly-D-lactide-polybutadiene (PDLA-PB) block copolymer to allow formation of stereocomplex crystallites in the blend during the processing.

In a preferred embodiment, the residence time in the extruder is at most 30 minutes, more preferably at most 20 minutes, more preferably at most 10 minutes, more preferably at most 8 minutes, more preferably at most 5 minutes.

As used herein, the term "residence time" refers to the time wherein the mixture is present in the extruder, or is present in a series of extruders.

In an embodiment, any of the previously described compositions may further comprise additives to impart desired physical properties, such as printability, increased gloss, or a reduced blocking tendency. Examples of additives may include, without limitation, stabilizers, ultra-violet screening agents, oxidants, anti-oxidants, antistatic agents, ultraviolet light absorbents, fire retardants, processing oils, mold release agents, coloring agents, pigments/dyes, fillers or combinations thereof, for example. These additives may be included in amounts effective to impart desired properties.

In some embodiments, said process for preparing a composition according to the present invention further comprises processing the composition using one or more polymer processing techniques selected from film, sheet, pipe and fiber extrusion or coextrusion; blow molding; injection molding; rotary molding; foaming; 3D printing, and thermoforming.

The present invention is also directed towards the use of poly-L-lactide-polybutadiene block copolymer, or poly-D-lactide-polybutadiene block copolymer, as additives to induce the crystallization of PDLA or PLLA respectively. In addition, the invention is also directed towards the use of poly-L-lactide-polybutadiene block copolymer, or poly-D-lactide-polybutadiene block copolymer as impact modifier to improve melt strength and impact strength for PDLA or PLLA respectively.

The present invention also encompasses a method for inducing the crystallization of poly-L-lactide comprising contacting a poly-L-lactide or a copolymer thereof with at least one first polymer selected from poly-D-lactide-polybutadiene (PDLA-PB) block copolymer, or poly-D-lactide-urethane-polybutadiene block copolymer.

The present invention also encompasses a method for inducing the crystallization of poly-D-lactide comprising contacting a poly-L-lactide or a copolymer thereof with at least one first polymer selected from poly-L-lactide-polybutadiene (PLLA-PB) block copolymer, or poly-L-lactide-urethane-polybutadiene block copolymer.

The present invention also encompasses a method for inducing the crystallization of PLLA or PDLA respectively comprising melt processing a blend comprising PDLA and poly-L-lactide-polybutadiene (PLLA-PB) block copolymer or PLLA and poly-D-lactide-polybutadiene (PDLA-PB) block copolymer to allow formation of PLLA/PDLA stereocomplex crystallites in the blend during the processing.

The present invention also encompasses the use of poly-L-lactide-polybutadiene (PLLA-PB) block copolymer, poly-D-lactide-polybutadiene (PDLA-PB) block copolymer, poly-L-lactide-urethane-polybutadiene block copolymer or poly-D-lactide-urethane-polybutadiene block copolymer, as polymer additive.

The present invention also encompasses the use of poly-L-lactide-polybutadiene (PLLA-PB) block copolymer, poly-D-lactide-polybutadiene (PDLA-PB) block copolymer, poly-L-lactide-urethane-polybutadiene block copolymer or poly-D-lactide-urethane-polybutadiene block copolymer, as impact modifier for polymers.

The present invention also encompasses polymers, membranes, adhesives, foams, sealants, molded articles, films, extruded articles, fibers, elastomers, composite material, adhesives, organic LEDs, organic semiconductors, and conducting organic polymers, 3D printed articles, comprising the composition according to the present invention.

The present invention also encompasses an article comprising a composition according to any of the embodiments previously described for the present invention, or prepared using a process according to the invention.

In some embodiments, said article comprising a composition according to any of the embodiments previously described for the present invention, or prepared using a process according to the invention; is a shaped article.

In some embodiments, said shaped article comprising a composition according to any of the embodiments previously described for the present invention, or prepared using a process according to the invention; is a molded article.

In an embodiment, said shaped article is produced by polymer processing techniques known to one of skill in the art, such as blow molding, injection molding, rotary molding, compression molding, 3D printing, and thermoforming.

In an embodiment, the compositions and blends thereof may be formed into a wide variety of articles such as films, pipes, fibers (e.g., dyeable fibers), rods, containers, bags, packaging materials, 3D printed articles, and adhesives (e.g., hot melt adhesives) for example, by polymer processing techniques known to one of skill in the art, such as forming operations including film, sheet, pipe and fiber extrusion and co-extrusion as well as blow molding, injection molding, rotary molding, 3D printing, and thermoforming, for example. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, hot melt adhesives, sheets, such as thermoformed sheets (including profiles and plastic corrugated cardboard), geomembranes and pond liners, for example. Molded articles include single and multilayered constructions in the form of bottles, tanks, large hollow articles, rigid food containers and toys, for example.

The present invention can be further illustrated by the following examples, although it will be understood that these examples are included merely for purposes of illustration and are not intended to limit the scope of the invention unless otherwise specifically indicated.

EXAMPLES

Unless otherwise indicated, all parts and all percentages in the following examples, as well as throughout the specification, are parts by weight or percentages by weight respectively.

Example 1 Preparation of
Poly-L-Lactide-Polybutadiene (PLLA-PB) Block
Copolymer

PLLA-PB-PLLA block copolymer was prepared by reacting hydroxy terminated polybutadiene (Krasol®LBH10000 from HSC Cray Valley Corp) with L-lactide in bulk, in the presence of a catalyst to prepare the copolymer. Krasol®LBH10000 from HSC Cray Valley Corp, had the following properties: Microstructure: 1,2-(vinyl): about 65% by weight, 1,4-cis: about 18% by weight; 1,4-trans: about 17% by weight; Content of OH groups 0.16-0.22 (Mmol/g), Hydroxyl number 8.9-12.4 Mg KOH/g, Viscosity Brookfield 20-50 Pa·s at 50° C. Density: about 0.9 g/cm$^3$ at 20° C.; Molecular weight (Mn): 9000-11000 g/mol; Polydispersity Index (Mw/Mn): 1.1. Purified L-Lactide from Futerro optical purity above 99.5% was used. Hydroxy terminated polybutadiene (7.78 g) and L-lactide (8.0 g) were heated to 185° C. under $N_2$ until a clear mixture was obtained. $Sn(Oct)_2$ (112 mg) was added. Polymerization was carried out for 30 min and the product (block copolymer 1) was precipitated in ethanol.

The modulus of the copolymer was measured as described in ISO 527-1BA. The result is shown in Table 1, and compared with the modulus for PLA (PLLA (NatureWorks® PLA polymer 6201D).

TABLE 1

| | Modulus on PLLA-PB-PLLA copolymer (tensile −20 mm/min-100%/min) at 23° C. | | | | | |
|---|---|---|---|---|---|---|
| Example | PB quantity % | HO-PB-OH (Mn) g·mol$^{-1}$ | Conversion % | Mn theoretic g·mol$^{-1}$ | Haze % | Modulus Mpa |
| PLA6201 | 0 | | | | <10 | 3260 |
| Copolymer 1 | 52 | 10.000 | 95 | 19.250 | <10 | 20 |

Example 2 Preparation of
Poly-D-Lactide-Polybutadiene (PDLA-PB) Block
Copolymer

PDLA-PB-PDLA block copolymer was prepared as described in example 1 except that L-Lactide was replaced with D-Lactide. Purified D-Lactide from Futerro with an optical purity above 99.5% was used.

Hydroxy terminated polybutadiene was reacted with D-lactide in bulk, in the presence of a catalyst to prepare the copolymer. Hydroxy terminated polybutadiene (7.78 g) and D-lactide (8.0 g) were heated to 185° C. under $N_2$ until a clear mixture was obtained. $Sn(Oct)_2$ (112 mg) was added. Polymerization was carried out for 30 min and the product (block copolymer 2) was precipitated in ethanol.

Example 3

Compositions 1-3 according to an embodiment of the invention were prepared by blending PLLA (Synterra® PLLA 2010 from Synbra technology b.v) with PDLA-PB-PDLA block copolymer 2 prepared in example 2. The physical properties of Synterra® PLLA 2010 are shown in Table 2. Composition 4 was prepared by blending PLLA-PB-PLLA block copolymer 1 prepared in example 1 with PDLA-PB-PDLA block copolymer 2 prepared in example 2.

TABLE 2

| PHYSICAL PROPERTIES | TEST METHOD | UNITS | SPECIFICATION |
|---|---|---|---|
| Appearance | | | round pellets |
| Color | | | Off white (crystallized) |
| Melt Flow Rate | ISO 1133 (190° C./2.16 kg) | g/600 s | 4 (+−2) |
| Polymer Density | ISO 1183 | g/cm$^3$ | 1.25 |
| Moisture content | | | <400 ppm |
| Residual Monomer | | % | <0.5 |
| D-Isomer | | % | <1 |

TABLE 2-continued

| PHYSICAL PROPERTIES | TEST METHOD | UNITS | SPECIFICATION |
|---|---|---|---|
| Melting temperature | DSC: ISO 11357 | °C. | 175-180 |
| Glass Transition temperature | DSC: ISO 11357 | °C. | 55-60 |

PLLA pellets were dried in a vacuum oven for 01 h at 110° C. The recipes of the compositions are shown in Table 3.

TABLE 3

| Compositions | PLLA 2010 (wt %) | PDLA-PB-PDLA Block copolymer 2 (wt %) |
|---|---|---|
| Composition 1 | 95 | 5 |
| Composition 2 | 80 | 20 |
| Composition 3 | 50 | 50 |

| Compositions | PLLA-PB-PLLA Block copolymer 1 (wt %) | PDLA-PB-PDLA Block copolymer 2 (wt %) |
|---|---|---|
| Composition 4 | 50 | 50 |

Composition 1 was melt blended in a (Haake) counter-rotating twin screw mini-extruder, at 4 bars, 200° C., 100 rpm and a residence time of 3 min for 5 passes.

Composition 2 was melt blended in a (Haake) counter-rotating twin screw mini-extruder, at 5 bars, 200° C., 100 rpm and a residence time of 3 min for 5 passes.

Composition 3 was melt blended in Brabender mixer, at 200° C., and a residence time of 2 min.

Composition 4 was melt blended in a (Haake) counter-rotating twin screw mini-extruder, at 230° C., 100 rpm and a residence time of 5 min.

The presence of stereocomplex in the PLLA matrix was verified by differential scanning calorimetry (DSC).

Figure 2:
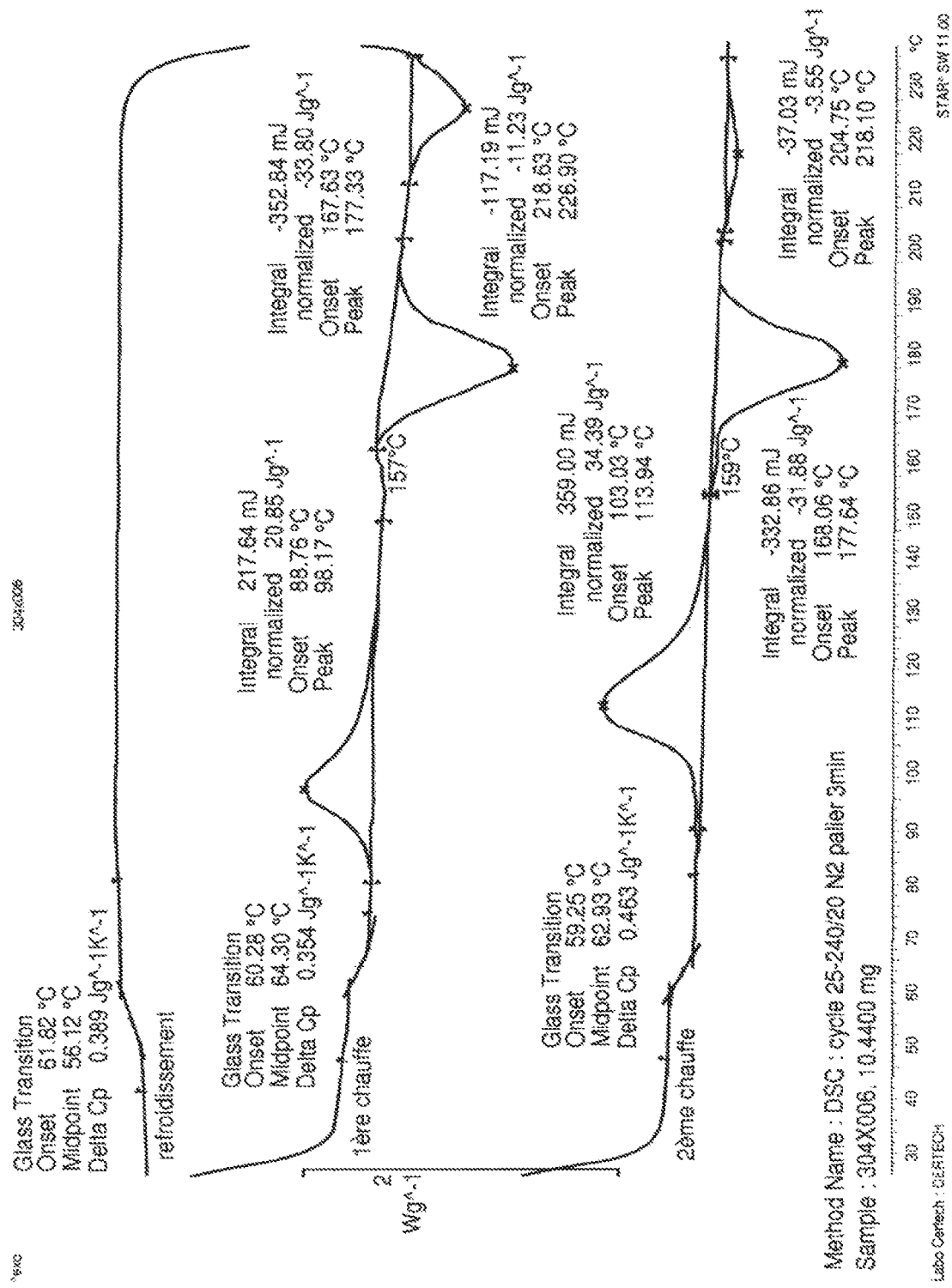
FIG. 2 represents a graph showing the DSC profile of composition 2 according to an embodiment of the invention.
Figure 3:
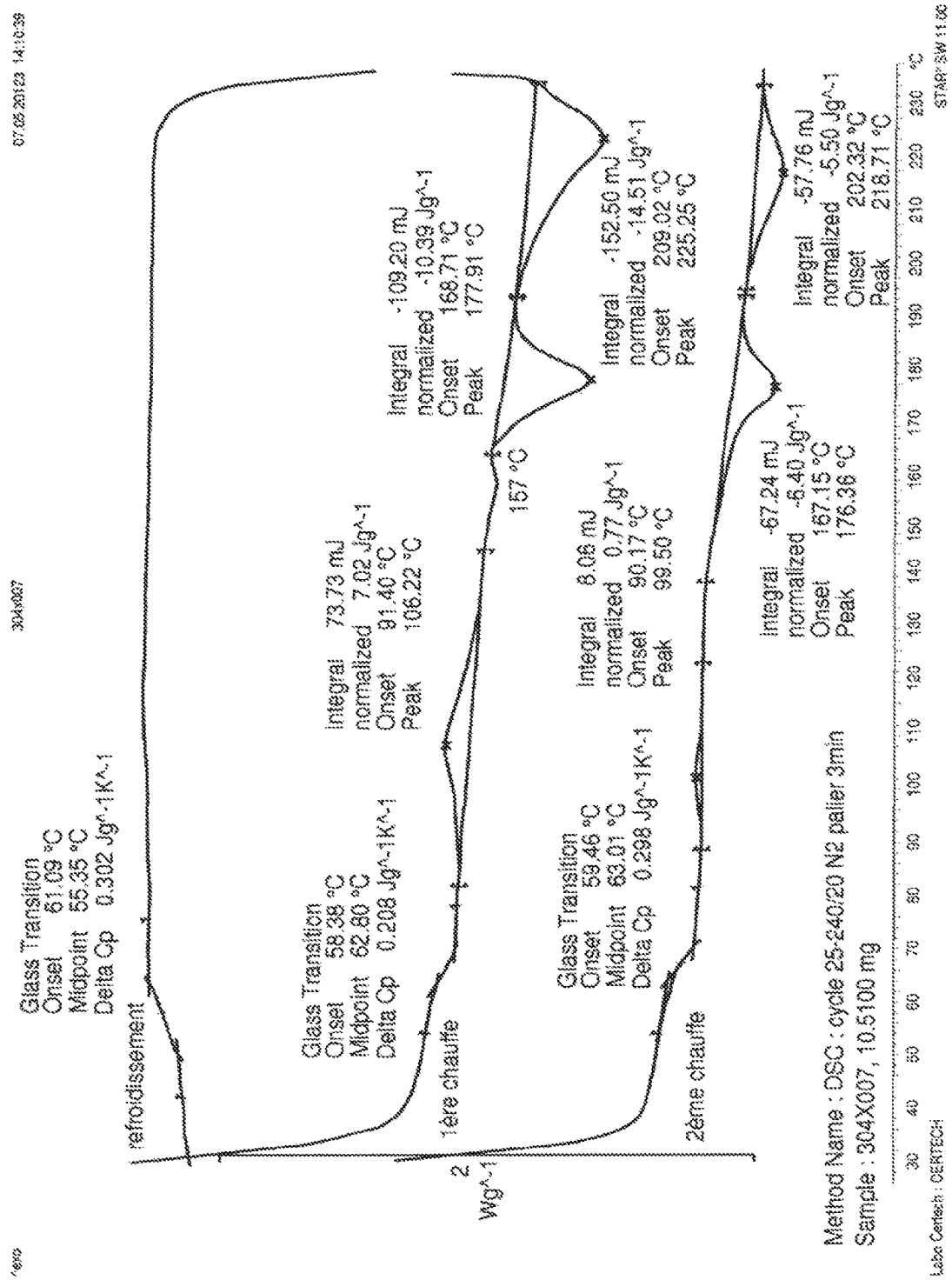
FIG. 3 represents a graph showing the DSC profile of composition 3 according to an embodiment of the invention.

Thermal properties were analyzed with Perkin-Elmer Pyris Diamond differential scanning calorimeter (DSC) calibrated with indium as standard. For compositions 1-3, the specimens were heated from 25 to 240° C. at a rate of 20° C./min, under $N_2$, followed by an isothermal at 240° C. for 3 min, and a subsequent cooling scan to 25° C. at rate of 20° C./min. And then were reheated to 240° C. at 20° C./min. For composition 4, the specimen was heated from 25 to 240° C. at a rate of 20° C./min, under $N_2$, followed by an isothermal at 240° C. for 3 min, and a subsequent cooling scan to 25° C. at rate of 20° C./min. And then were reheated to 270° C. at 20° C./min. Glass transition temperature (Tg), melting temperature (Tm) and the enthalpy of melting (ΔHm) were measured. The DSC thermograms of the compositions are presented in FIGS. 1 to 4.

Table 4 present the DSC results from the thermograms (FIGS. 1 to 4) of the compositions at the first heating step. Also Table 4 shows that the various contents of the compositions can influence the stereocomplex formation amount.

TABLE 4

| Compositions | Tg (° C.) | Tc (° C.) | Tm block homoPLA (° C.) | Tm stereo-complex (° C.) | ΔH$_m$ Stereo-complex J/g |
|---|---|---|---|---|---|
| Composition 1 | 63.71 | 99.79 | 177.73 | 225.11 | 3.10 |
| Composition 2 | 64.30 | 98.17 | 177.33 | 226.90 | 11.23 |
| Composition 3 | 62.80 | 106.22 | 177.91 | 225.25 | 14.51 |
| Composition 4 | 52.18 | | | 223.45 | 36.1 |

PDLA-PB-PDLA block copolymer in composition 1 was used for nucleating effect, inducing the crystallization of the PLLA in the composition.

PDLA-PB-PDLA block copolymer in composition 2 was used for impact resistance enhancement of the composition 2 comprising the PLLA.

PDLA-PB-PDLA block copolymer formed a stereocomplex with the PLLA in composition 3.

PDLA-PB-PDLA block copolymer 2 formed a stereocomplex with the PLLA-PB-PLLA Block copolymer 1 in composition 4.

Mechanical properties of the compositions were investigated by Izod impact tester. Un-notched Izod impact was measured at 23° C. according to ISO 180. Unnotched test specimen 9.99 mm×4.21 mm (section 42.1 mm$^2$) is held as a vertical cantilevered beam and is impacted at 3.5 m/s by a swinging pendulum (5.5 J).

The results are shown in Table 5.

TABLE 5

| Compositions | Un-notched Izod (kJ/m$^2$) |
|---|---|
| Composition 1 | 15.1 |
| Composition 2 | 129 |
| Composition 3 | 37.6 |
| Composition 4 | No break Too soft |

An exceptional impact has been obtained in the composition 2 with an Un-notched Izod measured at 129 kJ/m$^2$.

Composition 4 shows that stereocomplexes can be obtained with exceptional impact resistance at room temperature, while keeping a correct modulus over Tg (60° C.).

Composition 4 was further subjected to Dynamical mechanical analysis, the results of which are shown in FIG. 5.

Dynamic mechanical analysis (DMA) test was done using Gabo Eplexor 150N. Injected test sample nominally measuring 5 mm×1.5 mm×29 mm were used in traction mode. The bars were equilibrated to −80° C. for 20 minutes, and then DMA test was carried out with following conditions: temperature ramping up from −80° C. to +140° C. at a rate of 2° C./min, sinusoidal mechanical vibration imposed at an elongation of 0.12% at frequency of 20 Hz selected for determination of storage modulus (E'), loss modulus (E"), and complex modulus (E) as a function of temperature. Tan delta was computed by dividing the loss modulus (E") by the storage modulus (E').

The invention claimed is:

1. A composition comprising:
   (a) at least one first polymer comprising poly-L-lactide-polybutadiene (PLLA-PB) block copolymer; and
   (b) at least one second polymer comprising a poly-D-lactide-polybutadiene (PDLA-PB) block copolymer;
   wherein the composition comprises from 40% to 99% by weight of the second polymer based on the total weight of the composition.

2. The composition according to claim 1, wherein the poly-L-lactide-polybutadiene (PLLA-PB) block copolymer is selected from the group consisting of PLLA-PB diblock copolymer, PLLA-PB-PLLA triblock copolymer, PLLA-PB multiblock copolymer, PLLA-PB star copolymers, PLLA-PB comb copolymers, PLLA-PB gradient containing block copolymers; and mixtures thereof.

3. The composition according to claim 2, wherein the poly-D-lactide-polybutadiene (PDLA-PB) block copolymer is selected from the group consisting of PDLA-PB diblock copolymer, PDLA-PB-PDLA triblock copolymer, PDLA-PB multiblock copolymer, PDLA-PB star copolymers, PDLA-PB comb copolymers, PDLA-PB gradient containing block copolymers; and mixtures thereof.

4. The composition according to claim 1, the composition comprises from 2 to 55% by weight of the first polymer based on the total weight of the composition.

5. The composition according to claim 1, comprising from 1% to 60% by weight of poly-D-lactide-polybutadiene block copolymer based on the total weight of the composition; and from 40% to 99% by weight of the second polymer (b) based on the total weight of the composition.

6. A composition comprising:
(a) at least one first polymer comprising poly-D-lactide-polybutadiene (PLLA-PB) block copolymer; and
(b) at least one second polymer comprising poly-L-lactide-polybutadiene (PDLA-PB) block copolymer;
wherein the composition comprises from 40% to 99% by weight of the second polymer based on the total weight of the composition.

7. The composition according to claim 6, comprising from 1% to 60% by weight of poly-L-lactide-polybutadiene block copolymer based on the total weight of the composition; and from 40% to 99% by weight of the second polymer (b) based on the total weight of the composition.

8. A process for preparing a composition comprising:
melt processing a blend comprising poly-L-lactide-polybutadiene (PLLA-PB) block copolymer and poly-D-lactide-polybutadiene (PDLA-PB) block copolymer to allow formation of PLLA/PDLA stereocomplex crystallites in the blend during the processing.

9. The process according to claim 8, wherein the composition is melt blended at a temperature ranging from 160° C. to 230° C.

10. The process according to claim 8, further comprising processing the composition using one or more polymer processing techniques selected from film, sheet, pipe and fiber extrusion or coextrusion; blow molding; injection molding; rotary molding; foaming; and thermoforming.

11. An article comprising a composition according to claim 1.

* * * * *